United States Patent [19]

Bunn, Jr. et al.

[11] 4,003,725
[45] Jan. 18, 1977

[54] APPARATUS FOR PURIFYING HYDROGEN GAS

[75] Inventors: Julian Wilbur Bunn, Jr., Raleigh, N.C.; Charles Omar Buckley, Lewisburg, W. Va.

[73] Assignee: Trienco, Inc., Raleigh, N.C.

[22] Filed: May 3, 1976

[21] Appl. No.: 682,408

Related U.S. Application Data

[63] Continuation-in-part of Ser. No. 576,730, May 12, 1975, Pat. No. 3,972,695.

[52] U.S. Cl. .................. 55/158; 55/267
[51] Int. Cl.² .......................... B01D 53/22
[58] Field of Search ............ 55/16, 158, 267; 204/267, 266

[56] References Cited
UNITED STATES PATENTS

| | | | |
|---|---|---|---|
| 1,174,631 | 3/1916 | Snelling | 55/158 |
| 2,671,337 | 3/1954 | Hulsberg | 55/158 X |
| 3,245,206 | 4/1966 | Bonnet | 55/158 |
| 3,274,754 | 9/1966 | Rubin | 55/158 |
| 3,279,154 | 10/1966 | Emerson et al. | 55/158 |
| 3,616,928 | 11/1971 | Rosenblatt | 55/158 X |
| 3,751,880 | 8/1973 | Holm | 55/158 |
| 3,761,382 | 9/1973 | Hammond et al. | 55/158 X |

Primary Examiner—Thomas G. Wyse
Assistant Examiner—Robert H. Spitzer
Attorney, Agent, or Firm—B. B. Olive

[57] ABSTRACT

Pressurized impure hydrogen gas from a hydrogen generator, bottled hydrogen, or other source is fed to a separate palladium purifier unit having an ultrapure hydrogen output for analytical use, and the like. A plurality of palladium-silver tubes are inserted into a jacket tube to form a tube assembly which is coiled around a heated block. The jacket tube receives the impure hydrogen and the palladium-silver tubes pass pure hydrogen which is transferred to an outlet for use, with the gas impurities being discharged at a vent end of the jacket tube.

6 Claims, 5 Drawing Figures

APPARATUS FOR PURIFYING HYDROGEN GAS

CROSS REFERENCE TO RELATED APPLICATION

This application forms a continuation-in-part of allowed application Ser. No. 576,730 filed May 12, 1975 and entitled "Hydrogen Purifier" now U.S. Pat. No. 3,972,695.

BACKGROUND OF THE INVENTION

1. Field of the Invention

The invention relates to electrolytic apparatus for generating and purifying hydrogen. More particularly, the apparatus of the invention relates to the purification of impure hydrogen by permeation through the walls of a plurality of palladium-silver tubes.

2. Description of the Prior Art

As shown by U.S. Pat. No. 1,174,631 to Walter O. Snelling, it has long been known that a palladium wall will pass hydrogen in ionic form and will allow the hydrogen to recombine into molecular form so as to purify gases which include hydrogen as a constituent to obtain pure hydrogen. The permeability of hydrogen through palladium walls is dependent upon the thickness of the wall, the pressure differential on the sides of the wall, the temperature of the wall and the material from which the wall is made. Within operating ranges, the permeability is directly proportional to the pressure differential. The permeation rate increases exponentially with the increase in temperature. U.S. Pat. No. 2,773,561 to James B. Hunter teaches that a silver-palladium composition containing from 10 to 50% silver provides increased permeability over pure palladium. A number of hydrogen generators which use electrolytic action and palladium tube purifiers are on the market.

Early prior art generators using palladium tube purifiers used the palladium tube as the cathode which allows all of the positive ions in solution to migrate to the cathode to be reduced. Since only hydrogen ions pass through the palladium, all other ions tend to form surface alloys on the palladium tube and therefore tend to rapidly reduce hydrogen permeability. This problem is particularly critical because of the expense of such tubing.

U.S. Pat. No. 3,761,382 represented a breakthrough in the art of hydrogen generation by teaching a unitary, portable apparatus comprising a generation unit, a purifier unit, a water supply and a pump unit. The purifier of U.S. Pat. No. 3,761,382 is unique in the prior art since it is separated from the generator unit. Thus, the caustic electrolytic solution is not exposed to the purifier which means that surface alloys will not readily form on the silver-palladium tube. The device of the present invention specifically improves on the purifier described in U.S. Pat. No. 3,761,382. The invention is also useful as an inexpensive means for purifying bottled hydrogen gas as well as other sources of hydrogen.

Impure hydrogen gas is introduced into a pressurized chamber in the purifier of U.S. Pat. No. 3,761,382. The chamber contains a palladium-silver purifier tube arranged in helical turns. A pressure differential exists between the chamber and the inside of the palladium-silver tube thereby causing pure hydrogen to pass from the chamber to the inside of the tube and eventually to the pure hydrogen outlet. The temperature of the chamber and tube is maintained at the desired operating temperature by an electrical heating unit.

The major drawback of the patent purifier is that the input pressure of impure hydrogen gas is greatly limited because it is difficult to safely maintain a high pressure in the chamber. The patented purifier has generally been operated with a maximum chamber pressure of 400 psig. The chamber must be leak-proof because of the explosive nature of hydrogen. Also, the chamber must prove to be explosion-proof by meeting the requirements of a Class 1, Group B, enclosure as set forth in the National Electrical Code.

The impure hydrogen introduced into a purifier from bottle sources will occasionally contain air which has leaked into the line during a change of bottles. This air will react with the hydrogen and can cause an explosion with a pure $H_2O$ product. A drawback of the patent purifier is that a relatively large volume of impure hydrogen is contained within the chamber during operation. In the event of a leak of air into the chamber, this volume of hydrogen could react with the oxygen in the air and cause a dangerous explosion. The present invention greatly reduces the amount of impure hydrogen which is confined during operation; therefore, in the event of such an explosion, the explosion will be much less severe. In fact, the explosion will be contained within the jacket tube without any possibility of external damage.

It has been found that the prior art purifiers having a single palladium-silver tube are severely limited in capacity because there is a maximum flow rate of gas that may pass through the tube without creating turbulent flow. That is, with a single palladium-silver tube design operating at a given temperature and pressure differential, the capacity of the purifier can be increased only by increasing the length of the tube or by increasing the I.D. of the tube. However, the length may be increased only up to a certain limit because of the mentioned maximum flow rate. An increase in the I.D. necessitates an increase in the wall thickness of the tube in order to maintain the same burst characteristics, thus slowing down the permeation of pure hydrogen through the wall. Therefore, it becomes an object of the present invention to overcome these disadvantages by providing a workable hydrogen purifier having multiple palladium-silver tubes. These tubes are located within a single pressurized jacket tube so as to provide a compact and safe unit capable of easy assembly.

SUMMARY OF THE INVENTION

The purifier of the invention includes a purifier jacket tube and a plurality of palladium-silver tubes which fit within the jacket tube. Impure hydrogen gas at high pressure is introduced into the jacket tube so that the hydrogen surrounds the palladium-silver tubes and thereby allows the hydrogen to permeate the walls of the palladium-silver tubes.

At the inlet end, the jacket tube receives impure hydrogen at the desired pressure from the hydrogen source, and at its vent end the jacket tube discharges at controlled pressure the gas which has been exposed to the inner palladium-silver tubes. The palladium-silver tubes may be closed at one end and at the other end joined to an extension tube which carries the pure hydrogen to its outlet. Other tube arrangements are illustrated.

The jacket tube, palladium-silver tube arrangement is coiled around a heater block which is controlled to maintain the tubes at the desired operating temperature. The heater block and coiled tubes are surrounded by insulating material and then put into a suitable outer container.

It can be seen that the only pressurized gas is inside the tubes. Thus, the jacket tube should normally contain explosions which may occur in the line and should withstand the inlet pressure of impure hydrogen from the typical commercially available source. Therefore, the outer container does not necessarily have to be constructed to withstand pressure. However, as an added safety feature, the outer container can be made leak-proof and explosion-proof to give double protection. Although the jacket tube can be designed to withstand enormous internal pressure without rupturing, the palladium-silver tubes may suffer mechanical damage such as crushing when the pressure differential between the gases in the jacket tube and the palladium-silver tubes is in excess of approximately 2000 psi. However, the purifier of the invention can be expected to normally withstand pressure differentials far in excess of the pressure differentials employed in the known prior art devices. It is thus believed that the purifier of the invention is the first purifier which can directly take in impure hydrogen from a bottle supply at its stored pressure of approximately 2000 psi. Thus, there is no need to reduce the pressure of the bottled hydrogen through a series of valves and pressure regulators before introducing it into the purifier. The chance of contamination during such depressurization is eliminated.

The purifier of the present invention is much simpler to manufacture than the purifier of U.S. Pat. No. 3,761,382. It is not necessary to construct a large pressurized chamber since the pressurized gas is held within the tubes. The absence of welded joints cuts the cost of manufacture and decreases the chance of leaks. The invention greatly reduces the chance of palladium contamination during assembly since the palladium-silver tubes are handled only when they are inserted into the jacket tube. Assembly of the patented purifier required that the palladium-silver tubing be exposed while it was being formed into helical turns.

Another advantage of the present invention is that it is adaptable to various configurations. Furthermore, the capacity of the purifier can be varied merely by increasing the length of the palladium-silver tubes up to a predetermined maximum length, or by increasing the number of palladium-silver tubes within the jacket tube.

Therefore, the object of the invention is generally to improve on the type of hydrogen purifier described in U.S. Pat. No. 3,716,382 while retaining its many advantages, but principally to provide means for safely pressurizing the impure hydrogen gas which surrounds the palladium-silver tubing and to provide a compact and safe purifier with a much higher capacity than known in the prior art.

Other objects and advantages of this invention will become apparent when the following detailed description is read in conjunction with the appended drawings and claims. A preferred embodiment of this invention will now be described with reference to the accompanying drawings.

DESCRIPTION OF THE PREFERRED EMBODIMENT

Figure 1:
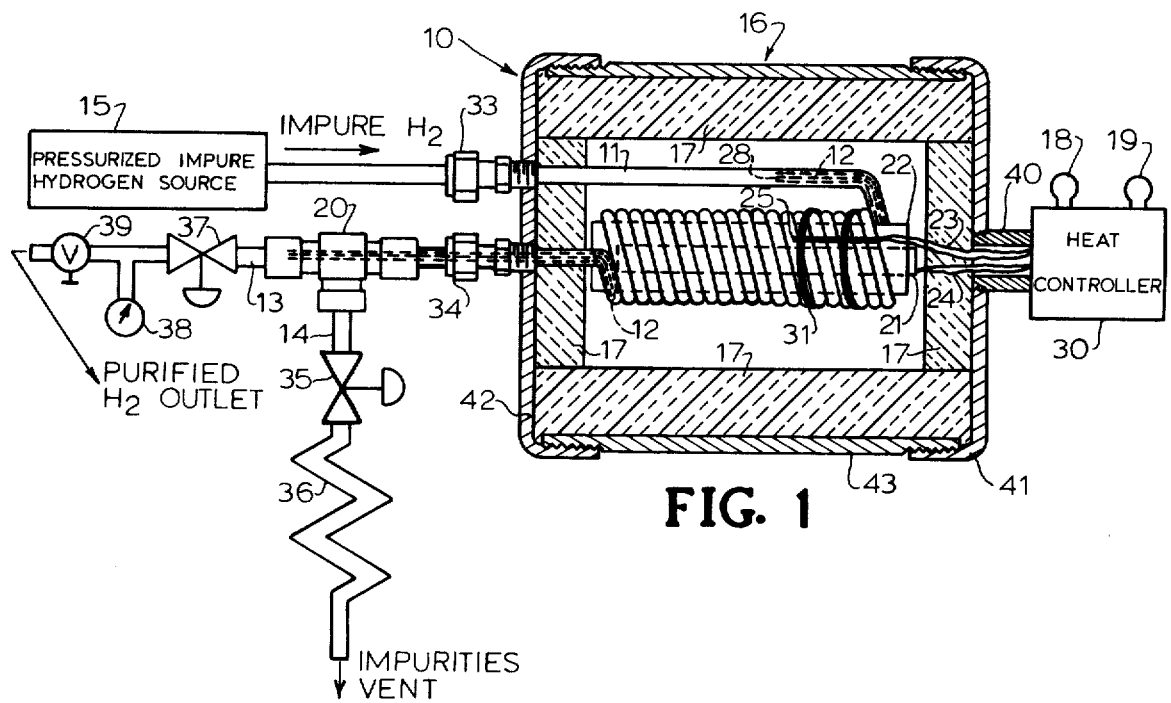
FIG. 1 is a partial section view of the purifier of the present invention.

As shown in FIG. 1, the hydrogen purifier 10 of the present invention receives impure hydrogen from hydrogen source 15 which may be bottled hydrogen or a hydrogen generator such as the one described in U.S. Pat. No. 3,761,382.

Purifier 10 includes a plurality of palladium-silver tubes 12 of predetermined size and length which terminate in sealed ends at point 28. Tubes 12 preferably contain 75% palladium and 25% silver. Palladium-silver tubes 12 are inserted into jacket tube 11 which is preferably stainless steel. By the use of a jig, the tubes are made into a coil as shown in FIG. 1. The coil is then fitted over heater block 22 which contains heater 21. A temperature sensor 25 is held on the outside of the coil by asbestos cord 31. Temperature sensor 25 is connected to heat controller 30 by temperature control leads 23. Heater 21 is connected to heat controller 30 by heater leads 24.

Heat controller 30 may take several electrical, electronic or electromechanical forms and is basically designed to control the energization of heater 21 by means of temperature sensor 25. Heater 21 in turn controls the temperature of heater block 22 and coiled tubes 11 and 12. Suitable circuitry is provided so that light 18 will indicate when the power to the unit is on and light 19 will burn constantly until the coil reaches the operating temperature at which time it will start to blink. Lights 18 and 19 enable the operator to quickly ascertain when the purifier is ready to receive impure hydrogen from the source.

The coiled tube and heater block assembly is fitted into a suitable outer container 16. In the preferred embodiment, container 16 has a threaded central member 43 of suitable internal diameter and two threaded cover members 41, 42. Tube 11 is secured to cover member 42 at its entrance and exit from container 16 by two full-ported, i.e. constant internal diameter, connectors 33, 34. Next, member 43 is mated with member 42. The void around the coiled tube is filled with a magnesium or other suitable insulating material 17. Cover member 41 is then screwed into place onto member 43 and leads 23, 24 are routed through connector pipe 40 to their connections in heat controller 30. In the preferred embodiment, container 16 and heat controller 30 together form a Class 1, Group B, explosion-proof chamber.

Figure 2:
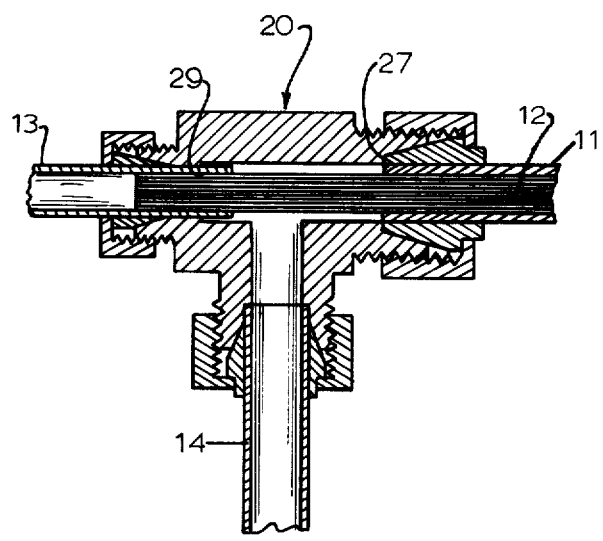
FIG. 2 is an enlarged section view of the T junction of the present invention showing the outlets for the pure hydrogen and gas impurities.

FIG. 2 illustrates T-junction 20 in which jacket tube 11 terminates at point 27 and the gas impurities are channeled into vent tube 14. Palladium-silver tubes 12 continue through junction 20 where tubes 12 are brazed or otherwise joined in a gas-tight connection to purifier tube extension 13 at point 29. Extension 13 is made from nickel or any other material which is impervious to gases and can be suitably connected to tubes 12. Purifier tube extension 13 carries the pure hydrogen gas to its outlet through manually adjustable pressure regulator 37 and manual valve 39 which is employed to open and close the pure hydrogen output. A pressure gauge 38 indicates the outlet pressure of the purified hydrogen. Extension 13 is made necessary because the palladium-silver tubes, if exposed to the atmosphere, would leak pure hydrogen to the atmosphere. Vent tube 14 carries the gas impurities to a vent where the gas impurities are discharged to the atmosphere through pressure regulator 35 and a restrictor 36. In the preferred embodiment, junction 20 is a commercially available Grylock Heat Exchanger Tee XT manufactured by Hoke, Inc., of Cresskill, N.J. The junction can be ordered by specifying the tubing O.D. of tubes 11, 13 and 14.

It should be appreciated that the impure hydrogen inlet and the impurities vent can be interchanged without any adverse effect upon the operation of the unit. That is, the impure hydrogen can be introduced into tube 14 and impurities can be vented through tube 11 proximate connector 33. Such an arrangement merely reverses the flow of impure hydrogen through the unit and has no effect on the output of pure hydrogen through extension tube 13.

Figure 4:
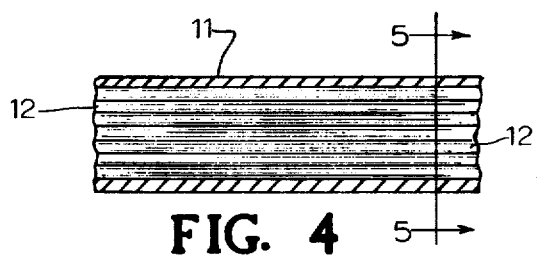
FIG. 4 is an enlarged section view of a segment of the jacket tube containing multiple palladium-silver tubes, taken substantially along line 4—4 of FIG. 5.
Figure 5:
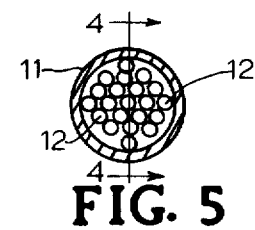
FIG. 5 is a section view of the tubes, taken substantially along line 5—5 of FIG. 4.

In the preferred embodiment and as best illustrated in FIGS. 4 and 5, jacket tube 11 is 0.38 inch I.D. stainless steel tubing. Such tubing is commercially available from Hoke, Inc. The Hoke stainless steel tubing is annealed seamless and has an allowable working pressure at 350° C operating temperature so that impure hydrogen gas may be introduced directly from bottle sources without danger of rupturing the tube. Palladium-silver tubes 12 preferably have a 0.030 inch O.D. and a wall thickness of 0.007 inch. The palladium-silver tubes are each approximately six feet long before they are inserted into the jacket tube. In the preferred embodiment, twenty-one tubes 12 are fitted into jacket tube 11 in such a manner that the entire tubes-within-a-tube assembly may be suitably bent into a coil or other compact tortuous path without appreciably constricting the central passages of the tubes.

A primary advantage of the multiple tube arrangement of the present invention is that a purifier of greater capacity may be constructed by merely including more palladium-silver tubes within a suitable jacket tube. Thus, the length and cross sectional dimensions of the palladium-silver tubes may be standardized at optimum values with only the number of such tubes being variable in purifiers of different capacities. As previously mentioned, the illustrated purifier utilizes twenty-one palladium-silver tubes inside a jacket tube with a 0.38 inch I.D. Another assembly having approximately twice the capacity of the illustrated purifier has 41 palladium-silver tubes inside a 0.50 inch I.D. jacket. There is no upper limit on the number of palladium-silver tubes which may be utilized within a given jacket tube so long as the tube assembly may be coiled or otherwise bent if desired after assembly. When the purifier is directly connected to a bottle source of impure hydrogen gas, the pressure of the impure gas introduced into jacket tube 11 can be in excess of 1000 psig without any danger of rupturing the jacket or crushing the palladium-silver tubes. When the purifier is used in conjunction with a hydrogen generator such as described in U.S. Pat. No. 3,761,382, a pressure differential of approximately 350 psi is maintained between the impure gas and the pure gas in tubes 12.

For example, with a pressure of 400 psig in tube 11, a pressure of 50 psig in tubes 12 and with the normal operating temperature of 350° C, the purifier emits pure hydrogen at a rate of approximately 525 cc per minute per tube 12 at 50 psig output line pressure. The emission rate of pure hydrogen can be controlled by regulating the pressure differential while keeping the temperature constant. Of course, both the temperature and pressure differential could be varied in any way desired within limits to control the emission rate.

In operation, the coil is brought to the desired temperature by heater 21. Impure hydrogen is then introduced into jacket tube 11 and pure hydrogen begins to pass through the wall of palladium-silver tubes 12. The pure hydrogen follows palladium-silver tubes 12 to junction 20 where it enters purifier extension tube 13. Extension tube 13 is connected to the pure hydrogen outlet. The gas impurities in jacket tube 11 flow into vent tube 14 at junction 20. Vent tube 14 is connected through pressure regulator 35 to a vent where the gas impurities are discharged by the atmosphere at controlled pressure.

In order to prevent plugging of the external surface of the palladium-silver tubes by impurites, there is a flow of gas from the impurities vent at all times. This vent flow carries away the impurities such as water vapor, hydrocarbons, and other gases whose concentration could reduce the capacity of the purifier. Vent flow should be adjusted so that maximum flow of pure hydrogen is constant. Should the pure hydrogen flow rate tend to decrease, this would indicate a build up of impurities on the palladium, and the vent rate should be increased until this is no longer apparent. From the above, it is evident that hydrogen gases of lower purity will require higher vent flows than the purer gases. Also, higher output flows will require higher vent flows. For example, if the impure hydrogen contains 20 parts per million of impurities and the pure hydrogen output is 2 liters per minute, the vent should be approximately 0.33 liter per minute, i.e., approximately one-sixth of the input is vented. If the impure hydrogen contains 1000 parts per million of impurities, approximately one-third to one-half of the input should be vented.

The unit is also provided with a regeneration cycle for keeping the palladium-silver tube free from impurities. During regeneration, the temperature of the palladium-silver tubes is kept constant at 500° C for a short time in order to burn off impurities which become attached to the tube.

Figure 3:
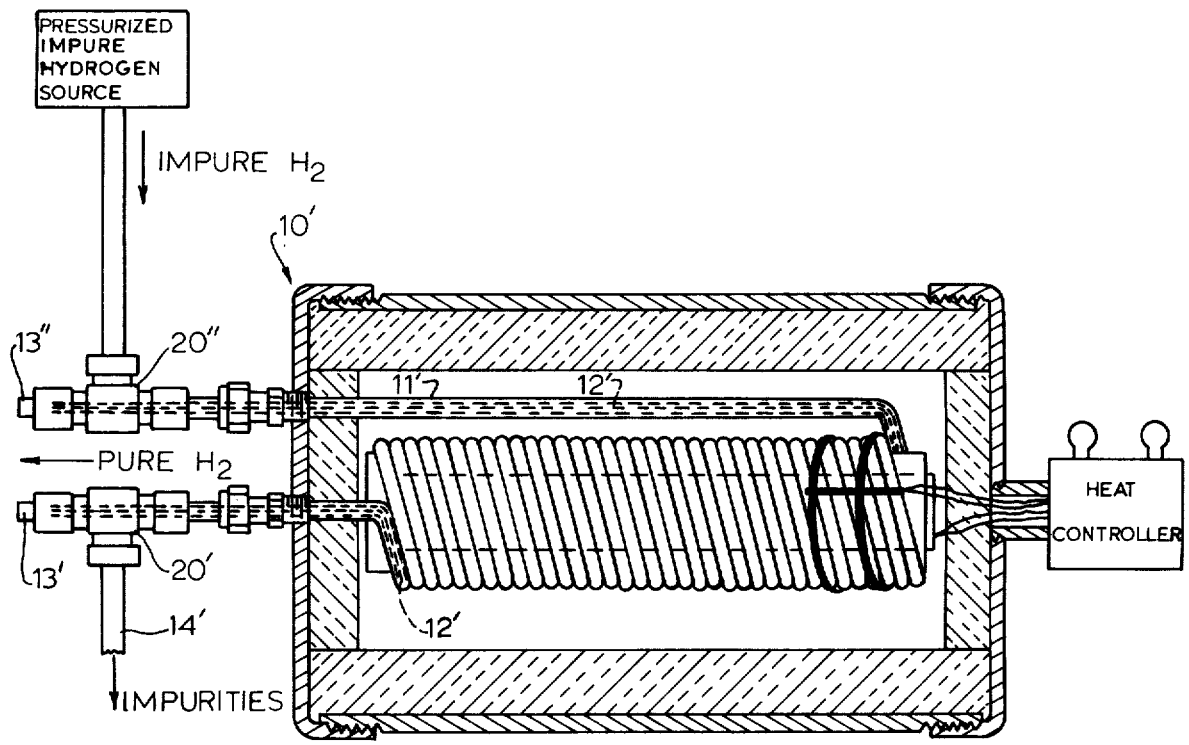
FIG. 3 is a partial section view of an alternative embodiment in which the palladium-silver tubes are open at both ends and are provided with two T junctions.

It has been found that because of the small inside diameter of the palladium-silver tubes of the preferred embodiment, the outlet rate of pure hydrogen per tube cannot greatly exceed 525 cc per minute. At rates significantly higher than this, the smooth, laminar flow at the outlet turns to a turbulent flow. This limitation on the outlet rate necessarily imposes a limitation on the length of the palladium-silver tubes in the coil since the outlet rate of pure hydrogen is directly proportional to the length of the palladium-silver tubes. However, if the palladium-silver tubes are open at both ends so that pure hydrogen can exit the palladium-silver tubes at both ends, the length of the palladium-silver tubes in the coil can be doubled and thus the output can be doubled. This can be accomplished by using a T junction at each end of the palladium-silver tubes as shown in the alternative embodiment of purifier 10' of FIG. 3.

In the alternative embodiment, pure hydrogen from both ends of tubes 12' exits both T junctions 20', 20"

through extensions 13', 13". The operating temperature, pressures, and the tube cross-sectional dimensions are the same as in the preferred embodiment. Since the length of tubing in the coil is doubled, the total output of pure hydrogen is doubled. Of course, the total mass of the pure hydrogen output will vary with the output pressure at a constant temperature.

The invention can be used in any of the embodiments described above to purify the gas produced by a conventional hydrogen generator to palladium purity, i.e., 99.9999 percent pure hydrogen. Another application of the invention is to connect it to a relatively inexpensive bottle of hydrogen gas, e.g., 99.9 percent pure, and purify it to palladium purity. The cost of 99.9 percent pure hydrogen in bottles is approximately one-twentieth the cost of palladium purity hydrogen in bottles. The purifier of the present invention can be used to convert the less expensive gas into palladium purity gas with a loss in volume due to venting of only one-third to one-half.

What is claimed is:

1. An apparatus for separating pure hydrogen gas from a hydrogen containing gas, comprising in combination:
   a. a gas-impervious metal jacket tube having an inlet end and a vent end and having a circular cross-section and a continuous central opening capable of receiving a plurality of tubes therein, said jacket tube having the characteristics of withstanding high internal pressures and of being bendable to form a compact tortuous path and when in such tortuous condition said jacket tube substantially maintaining said continuous central opening;
   b. a plurality of hydrogen permeable tubes inserted within said jacket tube and residing within said jacket tube along a substantial portion of the length of said permeable tubes, said permeable tubes each having at least one end thereof connected to pure hydrogen outlet means, and said permeable tubes each having a circular cross-section and a continuous central opening for the passing of pure hydrogen gas therethrough, said permeable tubes being grouped closely together and the spacing between said permeable tubes outer wall portions and the wall of said jacket tube central opening being such that said permeable tubes may not be appreciably bent without forming a corresponding bend in the respective adjacent portion of said jacket tube, said permeable tubes having the characteristic of being bendable to form a compact tortuous path without substantially altering said permeable tube continuous central opening, said jacket tube with said permeable tubes inserted therein together being bent into a compact tortuous path such that the outer wall portions of said permeable tubes remain in close spaced relation with the respective adjacent wall surfaces of said jacket tube central opening;
   c. heater means located proximate the tubes for maintaining said tubes at a controlled temperature;
   d. means for introducing a hydrogen containing gas into the inlet end of said jacket tube;
   e. means for venting gas impurities from the vent end of said jacket tube; and
   f. means for controlling the pressure in said tubes so that the pressure within said jacket tube and external of said permeable tubes is greater than the pressure within said permeable tubes.

2. An apparatus as claimed in claim 1 including heat insulation means for surrounding and insulating said tubes and heater means and including outer container means for enclosing said insulation means, tubes and heater means.

3. The apparatus of claim 1 wherein said jacket tube is a stainless steel tube.

4. The apparatus of claim 1 wherein said permeable tubes are palladium-silver tubes.

5. The apparatus of claim 4 wherein the outside diameter of said palladium-silver tubes is in the order of 0.030 inch and the wall thickness of such tubes is in the order of 0.007 inch.

6. An apparatus for separating pure hydrogen gas from a hydrogen containing gas, comprising in combination:
   a. a gas-impervious metal jacket tube having an inlet end and a vent end and having a circular cross-section and a continuous central opening capable of receiving a plurality of tubes therein, said jacket tube having the characteristics of withstanding high internal pressures and of being bendable by means of a jig, or the like, to form a helical coil, and when in a coiled condition said jacket tube substantially maintaining said continuous central opening;
   b. a plurality of hydrogen permeable tubes inserted within said jacket tube and residing within said jacket tube along a substantial portion of the length of said permeable tubes, said permeable tubes each having at least one end thereof connected to pure hydrogen outlet means, and said permeable tubes each having a circular cross-section and a continuous central opening for the passing of pure hydrogen gas therethrough, said permeable tubes being grouped closely together and the spacing between said permeable tubes outer wall portions and the wall of said jacket tube central opening being such that said permeable tubes may not be appreciably bent without forming a corresponding bend in the respective adjacent portion of said jacket tube, said permeable tubes having the characteristic of withstanding an external pressure substantially greater than their internal pressures and having the further characteristic of being bendable by a jig, or the like, to form a helical coil without substantially altering said permeable tubes continuous central openings, said jacket tube with said permeable tubes inserted therein together being coiled into a helical coil having a hollow core running the length of said coil and such that the outer wall portions of said permeable tubes remain in close spaced relation with the respective adjacent wall surfaces of said jacket tube central opening;
   c. heater block means having associated temperature control means, said heater block means being inserted within said coil hollow core for maintaining said tubes at a controlled temperature;
   d. heat insulation means for at least partially surrounding and insulating said tubes and heater block means;
   e. outer container means for enclosing said insulation means, tubes and heater block means;
   f. means for introducing a hydrogen containing gas into the inlet end of said jacket tube;
   g. means for venting gas impurities from the vent end of said jacket tube; and
   h. means for controlling the pressure in said tubes so that the pressure within said jacket tube and external of said permeable tubes is greater than the pressure within said permeable tubes.

* * * * *